United States Patent [19]
Jourdan

[11] 3,856,261
[45] Dec. 24, 1974

[54] PRESSURE RELIEF MEANS FOR VALVE BODY CHAMBER

[75] Inventor: Jerry W. Jourdan, Alvin, Tex.

[73] Assignee: ACF Industries, Incorporated, New York, N.Y.

[22] Filed: Aug. 2, 1973

[21] Appl. No.: 385,208

[52] U.S. Cl.................. 251/172, 137/112, 251/174
[51] Int. Cl............................................ F16k 25/00
[58] Field of Search ............ 137/112; 251/172, 174

[56] References Cited
UNITED STATES PATENTS

| | | | |
|---|---|---|---|
| 3,047,265 | 7/1962 | Kaiser............................ | 251/174 X |
| 3,122,352 | 2/1964 | Anderson......................... | 251/172 |
| 3,123,090 | 3/1964 | Bredtschneider................. | 137/112 |
| 3,570,521 | 3/1971 | Kirschenman................... | 137/112 X |
| 3,617,025 | 11/1971 | Gerbic.............................. | 251/172 |
| 3,776,506 | 12/1973 | Fowler............................. | 251/172 |

FOREIGN PATENTS OR APPLICATIONS

| 1,213,078 | 10/1959 | France.............................. | 251/172 |

Primary Examiner—Harold W. Weakley
Attorney, Agent, or Firm—Eugene N. Riddle

[57] ABSTRACT

A pressure relief means for the body chamber of a spherical plug valve. Upstream and downstream annular sealing members are mounted on opposed sides of the ball or spherical plug valve. A separate pilot control valve for each sealing member is mounted outside the valve body and has a central bore with a shuttle member movable back and forth within the bore. The central bore communicates with the adjacent flowline and with the valve body chamber and normally blocks the flow of fluid between the flowline and body chamber. The shuttle member has a check valve therein responsive to fluid pressure within the body chamber and opened at a predetermined high pressure in the body chamber to permit a flow of fluid from the body chamber to the flowline thereby to reduce any excessive fluid pressure within the valve chamber.

2 Claims, 4 Drawing Figures

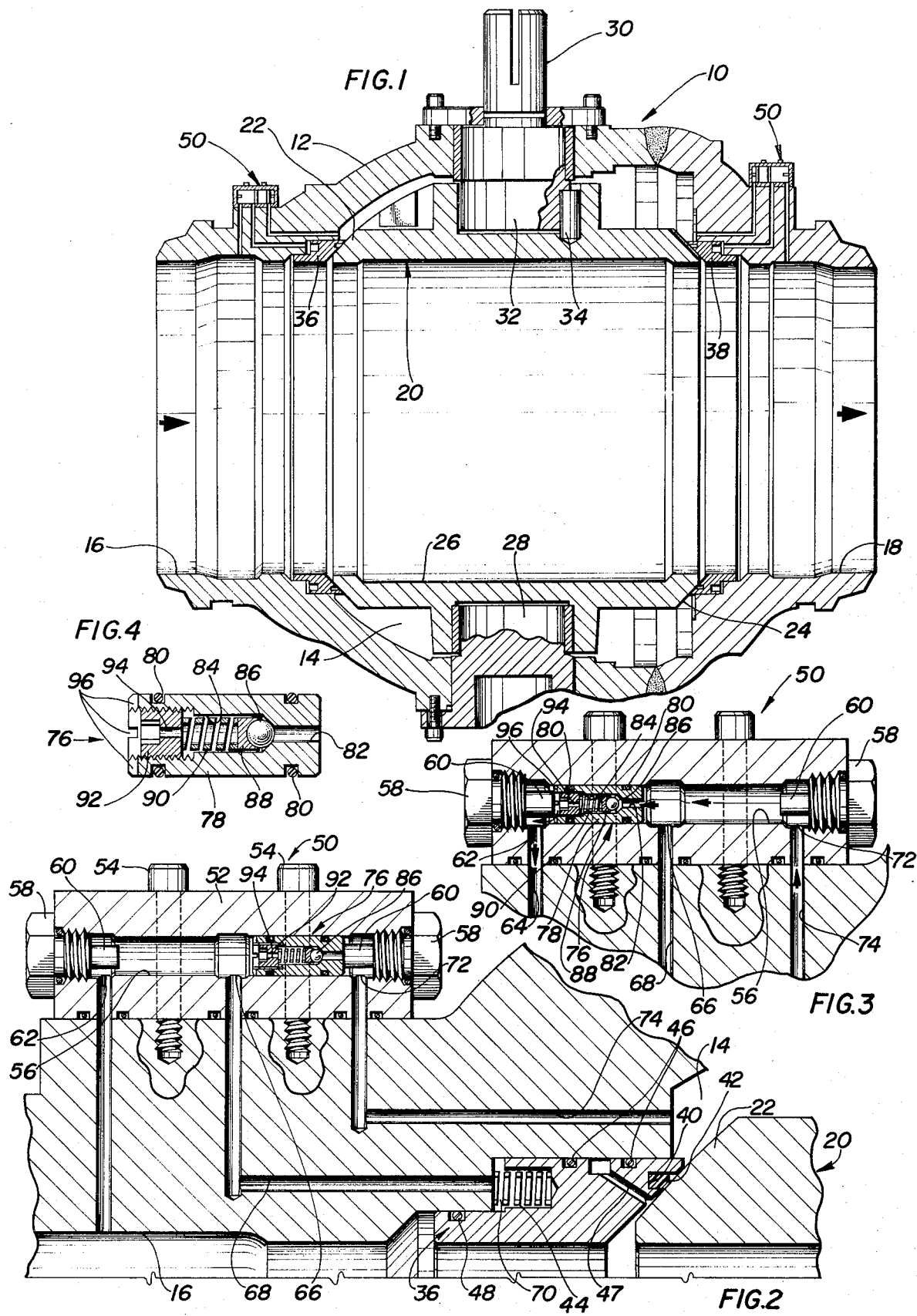

PRESSURE RELIEF MEANS FOR VALVE BODY CHAMBER

BACKGROUND OF THE INVENTION

Heretofore, spherical plug or ball valves have had externally mounted pressure relief valves communicating directly with the valve chamber and releasing to atmosphere any excessive fluid pressure within the body chamber. When released to atmosphere the product within the flowline contaminates the surrounding area which may be highly undesirable particularly if the valve is positioned within a building or the like. Also, a loss of product results when the product is released to atmosphere.

Further, if a pressure relief valve is mounted exteriorly of a valve body so that it may be easily accessible, it is possible that the relief valve may be tampered with or damaged. Sometimes a casual bystander or the like may tamper with the adjustment of a relief valve if the relief valve is easily accessible and this might result in a faulty operation.

Reference is made to U.S. Pat. No. 3,776,506 dated Dec. 4, 1973 and entitled "Valve Structure Having Fluid Pressure Actuated Sealing Member," in which a spherical valve structure is disclosed having a pilot control valve as shown generally herein but not disclosing any type of pressure relief for the valve body. The present invention is particularly adapted for use with a spherical valve structure such as shown in U.S. Pat. No. 3,776,506.

DESCRIPTION OF THE PRESENT INVENTION

A spherical plug or ball valve is provided having a valve ball mounted within a valve chamber to form a body cavity between the valve body and valve ball. Upstream and downstream annular sealing members are mounted on opposed sides of valve ball. A separate control valve for each sealing member is mounted on the outer surface of the valve structure and includes a body having a central bore and three ports spaced longitudinally of the control valve body communicating with the bore. A shuttle member is mounted within the central bore for sliding movement back and forth between positions selectively communicating end ports with the intermediate port. A fluid conduit connects one end port with the associated flow passage and another fluid conduit connects the other port with the valve body chamber. The shuttle member normally blocks any flow of fluid between the flowline and valve body chamber and has a check valve which is actuated at a predetermined high fluid pressure reached in the valve body chamber. Upon the opening of the check valve at the predetermined high temperature in the valve body chamber a flow of fluid from the valve chamber to the flowline is provided thereby to reduce excessive fluid pressure within the valve chamber.

By the present arrangement, the flowline fluid is not exhausted to atmosphere but is directed back into the flowline through a conduit extending from the control valve body. Thus, the atmosphere is not contaminated and no flowline fluid is released exteriorly of the valve. Further, no loss of the product being transported will result since the product from the valve body chamber is communicated back to the flowline and not to atmosphere or some other area.

It is noted that the check valve is mounted within a shuttle which in turn is mounted within a bore in the pilot or control valve. The shuttle is not easily accessible except by disassembly of the pilot valve and the location of the check valve cannot be determined by a visual observation outside the valve body. Thus, it is highly unlikely that any person will remove the shuttle from the control valve in order to adjust or tamper with the check valve.

The invention accordingly comprises the constructions hereinafter described, the scope of the invention being indicated in the following claims.

In the accompanying drawings, in which one of various possible embodiments of the invention is illustrated, FIG. 1 is a sectional view of a spherical plug valve structure comprising the present invention having a pilot control means including a shuttle member mounted on the exterior of the valve;

FIG. 2 is an enlarged fragment of FIG. 1 showing the shuttle within the pilot control valve being in one position to permit the flowline pressure to be exerted against the sealing member;

FIG. 3 is a view similar to FIG. 2 but showing the shuttle member in its position in which an excessively high body fluid pressure is exerted against the shuttle member to open the check valve therein and permit the flow of fluid from the body chamber to the flowline; and FIg. 4 is an enlarged view of the shuttle removed from the pilot control valve.

Referring now to the drawings for a better understanding of this invention, a valve structure which may be a spherical plug or ball valve structure is indicated generally at 10 in FIG. 1 and has a valve body 12 defining a valve chamber or body cavity 14. Valve body 12 has an upstream flow passage 16 and a downstram flow passage 18. The outer end portions of valve body 12 defining flow passages 16 and 18 may be provided with screw threads to provide a connection for valve structure 10 with suitable conduits (not shown) in a flow system as well known in the art.

Positioned in body cavity 14 is a rotatable valve ball 20 having annular seating surfaces 22 and 24 and a flow passage 26 in alignment with flow passages 16 and 18 in the open position of valve ball 20 shown in FIG. 1. Valve body 20 is mounted on a lower trunnion 28. An upper shaft 30 includes an upper trunnion 32 keyed at 34 to ball valve 20. Suitable drive means may be connected to shaft 30 to rotate valve ball 20 about trunnion 28 between open and closed positions relative to flow passages 16 and 18.

Mounted adjacent opposing ends of valve ball 20 are upstream sealing member 36 and downstream sealing member 38 which are annular and adapted to fit against respective seats 22 and 24 of valve ball 20. Sealing members 36 and 38 are pressure actuated and are urged by fluid pressure against seats 22 and 24 to provide a tight seal between valve ball 20 and seat members 36 and 38.

Sealing members 36 and 38 are identical and each sealing member has an annular groove 40 therein receiving an insert 42 which is formed of a resilient plastic material and extends beyond the adjacent face of sealing member 36 to contact the adjacent seating surface 22 on valve ball 20. A spring 44 continuously urges sealing member 36 toward valve ball 20. O-rings 46 are mounted on each side of lubricant port 47 of sealing member 36. An O-ring 48 provides a seal between flowline fluid pressure and the remainder of sealing member 36.

Pilot control valves are generally indicated 50. Each pilot control valve 50 includes a body 52 secured to the outer surface of valve body 12 by suitable threaded studs 54. Body 52 has a central bore 56 which is closed by end plugs 58 having inner extensions 60 forming stops. Central bore 56 has an end port 62 in fluid communication with conduit 64 to flowline 16. An intermediate port 66 is in communication with conduit 68 to provide fluid pressure to a fluid chamber 70 at a rear face of sealing member 36. End port 72 communicates with conduit 74 leading to body cavity 14.

Mounted in central bore 56 for sliding movement is a shuttle member generally indicated 76. Shuttle member 76 includes a body 78 having O-rings 80 to prevent leakage of fluid past shuttle member 76. A central bore 82 extends through body 78 and includes an enlarged diameter portion 84. Enlarged diameter bore portion 84 houses a ball check valve 86 seated on a follower 88 which is urged by spring 90 to the closed position of ball valve 86 as shown in FIG. 2. A threaded end plug 92 may be adjusted to control the operating fluid pressure at which ball valve 86 will open. Plug 92 has external screw threads engaging internal screw threads within bore 84 and has a central opening 94 extending therethrough. Grooves 96 in the outer end of body 78 permit the flow of fluid past body 78 when body 78 abuts extension 60 in the open position of ball valve 86.

As shown in FIG. 2, shuttle member 76 is shown in the position in which flowline pressure in upstream flowline 16 is greater than the body pressure within valve cavity or chamber 14. In this position, flowline pressure is communicated through port 66 and conduit 68 to chamber 70 to urge sealing member 36 into sealing engagement with valve ball 20. However, when fluid pressure within valve cavity 14 exceeds the fluid pressure within flowline 16, shuttle 76 will move to the position it occupies in FIG. 3 and body fluid pressure is communicated through conduit 68 to chamber 70 to urge sealing member 36 into engagement with valve ball 20. Upon the fluid pressure in body cavity 14 reaching an excessive amount, valve ball 86 is moved to an open position as shown in FIG. 3 and fluid pressure from body cavity 14 is communicated to flowline 16 which results in a decrease in fluid body pressure to an amount at which no damage to valve 10 will result. Upon the opening of valve ball 86 fluid line pressure is communicated through bore 82, enlarged diameter portion 84, bore 94, grooves 96, and thence through port 62 and conduit 64 to flowline 16. Thus, when an excessive body pressure is reached, the pressure is bled off to flowline 16 through shuttle 76. In this manner, the product within valve cavity 14 is returned to the flowline and is not exhausted to atmosphere or to some other area.

What is claimed is:

1. A ball structure comprising a valve body and upstream and downstream flowlines, a valve member mounted within the valve body, means to move the valve member between open and closed positions to control the flow of fluid, a fluid pressure actuated sealing member on opposed sides of the valve member providing upstream and downstream sealing members, a separate pilot valve for each sealing member mounted outside the valve body, each pilot valve including a body having a central bore and three ports communicating with the bore and spaced longitudinally of the pilot valve body to provide intermediate and end ports, a first fluid conduit between the intermediate port and associated sealing member to provide fluid rearwardly of the sealing member to urge the sealing member toward the valve member, a second fluid conduit between one end port and the associated flowline, a third fluid conduit between the other end port and the valve body, a shuttle member responsive to fluid pressure from said end ports slidable back and forth within the central bore between positions selectively communicating the intermediate port with one of the end ports and blocking flow to the other end port thereby to provide fluid rearwardly of the sealing member, the shuttle member having a check valve therein which is actuated at a predetermined high fluid pressure in the valve body when the shuttle valve is in a position blocking flow to the second fluid conduit, said shuttle member upon a fluid pressure being reached in the valve body greater than the fluid pressure in the flowline being moved to the position blocking flow to the second fluid conduit, said check valve within the shuttle member being opened at said predetermined high temperature in the valve body to permit a flow of fluid from the valve body to the flowline through the second fluid conduit thereby to reduce any excessive fluid pressure within the valve body.

2. A ball valve structure as set forth in claim 1 wherein said shuttle member has a central bore extending therethrough and said check valve is mounted within said bore, said check valve including a ball and spring means urging the ball toward a closed position with respect to said bore.

* * * * *